(No Model.) 2 Sheets—Sheet 1.

J. A. MUMFORD.
SHINGLE SAWING MACHINE.

No. 411,825. Patented Oct. 1, 1889.

Witnesses.
Chas. R. Burt.
A. J. Stuart.

Inventor
Joseph A. Mumford
By Church & Church
his Attorneys.

(No Model.) 2 Sheets—Sheet 2.

J. A. MUMFORD.
SHINGLE SAWING MACHINE.

No. 411,825. Patented Oct. 1, 1889.

Witnesses.
Chas. R. Burr.
A. F. Stuart.

Inventor.
Joseph A. Mumford
By Church & Church
his Attorneys.

UNITED STATES PATENT OFFICE.

JOSEPH A. MUMFORD, OF HANTSPORT, NOVA SCOTIA, CANADA.

SHINGLE-SAWING MACHINE.

SPECIFICATION forming part of Letters Patent No. 411,825, dated October 1, 1889.

Application filed October 22, 1887. Serial No. 253,112. (No model.)

*To all whom it may concern:*

Be it known that I, JOSEPH A. MUMFORD, of Hantsport, Nova Scotia, Canada, have invented certain new and useful Improvements in Shingle-Sawing Machines; and I do hereby declare the following to be a full, clear, and exact description of the same, reference being had to the accompanying drawings, forming a part of this specification, and to the figures and letters of reference marked thereon.

My present invention relates to that class of shingle-machines in which the shingles are formed from a block of wood fed to a suitable saw at predetermined intervals, either when combined with suitable jointing devices or not, the said invention having for its object to render the machine more effective, as well as to so arrange the various parts of the machine as that complete shingles may be made more rapidly than has been possible with machines as heretofore constructed.

The invention consists in certain novel details of construction, combinations, and arrangements of parts, to be hereinafter described, and pointed out particularly in the claims at the end of this specification.

Figure 1:
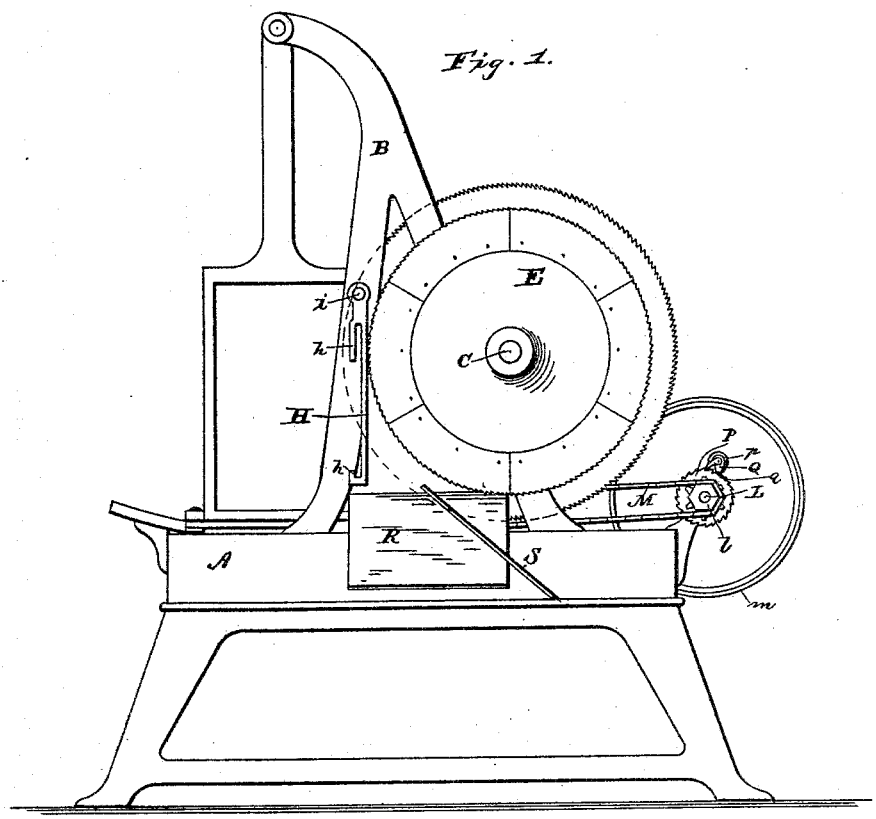
Figure 2:
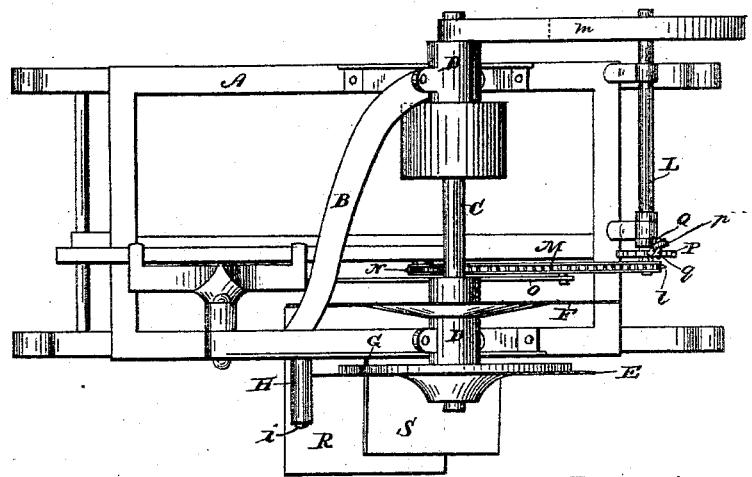
Figure 3:
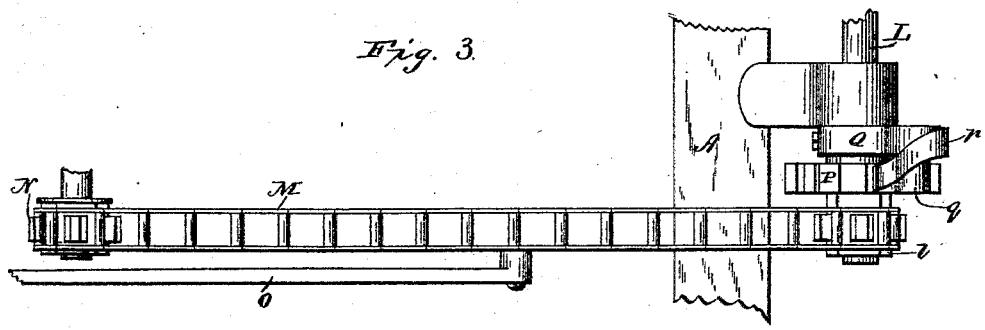
Figure 4:
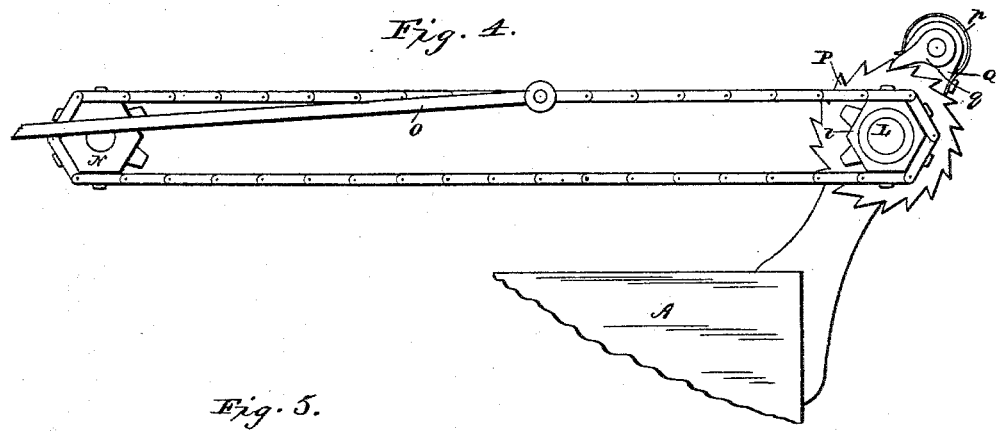
Figure 5:
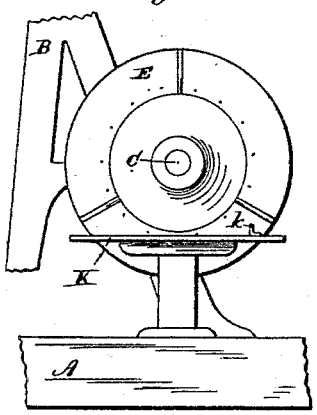

In the accompanying drawings, Figure 1 is a side elevation of a shingle-sawing machine constructed in accordance with my invention. Fig. 2 is a top plan view of the same. Figs. 3 and 4 are views of the block-carriage-feeding mechanism. Fig. 5 is a view of another form of jointer with shingle-supporting table.

Similar letters of reference in the several figures indicate the same parts.

For convenience I have illustrated my invention as applied to a shingle-sawing machine in which the shingle-block is carried by a swinging frame hung from the top of the frame B, which supports the journals for the saw and jointer arbor C, said frame being bolted or otherwise secured to a suitable bed-plate A, as shown, for instance, in my prior patent, No. 204,499, dated June 4, 1878, although, as is obvious, it may be applied to shingle-machines in which other forms of carriages are employed.

The journals D, in which the arbor C takes its bearings, are somewhat widely separated, preferably on opposite sides of the bed plate or frame A, so as to leave room for the driving-pulley and saw between them, as well as the carriage-operating mechanism, which is more conveniently located at this point. On the forward end of the arbor C, outside the journal-box, I locate the jointer E, which may be a rather fine-toothed saw or segments of a saw united, as shown in Fig. 1, or an ordinary planer-jointer, as described in my before-mentioned patent and illustrated in Fig. 5 of the present case. The preferred form of jointer, however, is that first mentioned in which the segments of saw-blade are bolted or riveted to the face of a comparatively heavy balance-wheel G.

The carriage for supporting the shingles while they are being subjected to the action of the jointer consists of a swinging frame H, hung to the saw-arbor frame by a stud-axle $i$, the shingles being slipped in behind guides $h$ on its face, the frame then being swung forward to joint the shingles, as will be presently explained.

In the other form of jointer, Fig. 5, an adjustable table K, having a stop $k$ thereon for supporting the shingles while being jointed, is preferably used, although the swinging carriage may be used to good advantage.

The short shaft L is journaled on the bed-plate or frame A, carrying a sprocket-wheel $l$ at its forward end and a driving-pulley at its other end, to which motion is communicated by a belt $m$, passing over a small pulley on the rear end of the saw-arbor C. The sprocket-wheel carries a link-chain M, running over another sprocket-wheel N, which has its bearing on a stud-axle secured to the frame A. This chain runs in a line parallel to the movement of the shingle-block carriage, and is connected therewith by a pitman or arm O. Thus it will be seen that when the chain is set in motion in one direction the said carriage will be given a reciprocatory movement toward and from the saw F, as will be readily understood from an inspection of Figs. 3 and 4.

As thus far described the carriage-operating mechanism is designed to positively operate the same in both directions, which is desirable when the shingles are sawed off at both the forward and backward movements of the carriage; but the machine illustrated is designed to saw a shingle only during its forward movement, and I provide a mechanism for allowing the quick return of the carriage to first position, ready to be again brought forward, as follows: The sprocket-wheel *l* is mounted loosely on the shaft L and is cast integral with or connected rigidly to the ratchet-wheel P, (see Figs. 3 and 4,) while a collar or arm Q is mounted on and connected rigidly to the said shaft in juxtaposition to the ratchet-wheel, the arm carrying at its outer end a pawl *q*, held in engagement with the ratchet-wheel by spring *p*.

The operation will now be readily understood. The carriage, being hung as illustrated—that is, so as to return to first position by its own weight, or else having a weight or spring connected therewith for accomplishing the same object—will be drawn forward by the pitman and chain until the shingle has been sawed from the block and the end of the pitman has passed around the sprocket-wheel *l*, when the weight of the carriage will assert itself and cause the chain and sprocket-wheel to move faster than the driving-shaft, the pawl and ratchet-wheel permitting such a movement in the return direction, although it locks the sprocket-wheel and shaft rigidly together during the upward movement.

It is obvious that any form of clutch which will permit a free movement in one direction may be employed in lieu of the pawl and ratchet shown, and I do not wish to be limited thereto.

The jointer on the saw-shaft is located on the side of the saw on which the sawed shingles are delivered, or on the side opposite to that on which the block and its carriage move, the operative face of the jointer being located farthest from the saw. An inclined guide or chute R extends from a point in proximity to the saw, where it will catch the shingles as they are sawed off, to a point somewhat beyond the operative face of the jointer, or to the side farthest from the saw, so that the shingles as they are sawed will immediately slide off to a point beyond the jointer, in convenient position to be taken up by the operator and presented to the jointer in the carriage H, which is swung far enough to allow the whole of one edge to be acted on. The shingles, after the jointing operation, are thrown into the chute S, which carries them to any convenient place for bunching or for further finishing steps, as will readily be understood.

When the jointer shown in Fig. 6 is employed, the shingles are placed on the table and the edges pressed against the jointing-knives, as will be readily understood by those skilled in the art.

I have not deemed it necessary to illustrate the mechanism for feeding the block forward in relation to its carriage, as any of the well-known mechanisms may be employed for accomplishing this result.

From the above it will be seen that I have produced a shingle-machine automatic so far as the sawing operation is concerned, and having the jointing mechanism located in the most convenient position for operating upon the shingles as rapidly as they are sawed off. The carriage for carrying the shingles while being jointed may be located at any point around the circumference of the jointer, although it has been found very convenient to locate it in the position shown in Fig. 1.

Having thus described my invention, what I claim as new is—

1. In a shingle-sawing machine, the combination, with the block-carrying carriage and the saw, of a jointer mounted on the saw-arbor and a swinging carriage for holding the shingles while being jointed, substantially as described.

2. In a shingle-sawing machine, the combination, with the block-carrying carriage and saw, of a balance-wheel mounted on the saw-arbor having a jointing-saw secured to its periphery and a swinging carriage for holding the shingles while being presented to the jointing-saw, substantially as described.

3. In a shingle-sawing machine, the combination, with the saw, and the pivoted block-carrying carriage free to swing in one direction, of the endless chain running over suitable guide and power pulleys, and a connection between said chain and pivoted block-carrying carriage, whereby the latter is caused to swing with relation to the saw, substantially as described.

4. In a shingle-sawing machine, the combination, with the saw and a reciprocating block-carrying carriage free to move in one direction, of an endless chain running over suitable guide and power pulleys connected to said block-carrying carriage by a pitman, whereby the said carriage is caused to reciprocate with relation to the saw, substantially as described.

5. In a shingle-sawing machine, the combination, with the saw and reciprocating block-carrying carriage, of an endless chain running over suitable guide and power pulleys connected to said block-carrying carriage by a pitman and a clutch-connection between said power-pulley and its driving-shaft, whereby the carriage is caused to move toward the saw, but is free to move in the opposite direction, substantially as described.

6. In a shingle-sawing machine, and in combination with the saw and block-carrying carriage, a continuous chain running over sprocket-wheels and connected to said carriage, one of said sprocket-wheels being connected rigidly to a ratchet-wheel, and a pawl mounted rigidly on the power-shaft for engaging said ratchet-wheel, whereby the carriage is moved positively in one direction, but is free to move in the opposite direction, substantially as described.

7. In a shingle-sawing machine, and in combination with the saw and reciprocating block-carrying carriage, a mechanism for causing the reciprocation of said carriage, consisting of a continuous chain connected therewith and running over suitable sprocket-wheels, one of which is connected to a ratchet-wheel and loosely mounted on the power-shaft, and a pawl mounted on said shaft for engaging said ratchet-wheel and causing its rotation in one direction, but leaving it free to rotate in the opposite direction, substantially as described.

JOSEPH A. MUMFORD.

Witnesses:
 KELSEY FRANCIS,
 JOSEPH FISH.